(12) United States Patent
Fukuzawa et al.

(10) Patent No.: US 10,862,349 B2
(45) Date of Patent: Dec. 8, 2020

(54) METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

(71) Applicant: TDK Corporation, Tokyo (JP)

(72) Inventors: Narutoshi Fukuzawa, Tokyo (JP); Kazunori Oshima, Tokyo (JP); Akira Gotani, Tokyo (JP); Kazuki Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 2 days.

(21) Appl. No.: 16/469,063

(22) PCT Filed: Dec. 20, 2017

(86) PCT No.: PCT/JP2017/045745
§ 371 (c)(1),
(2) Date: Jun. 12, 2019

(87) PCT Pub. No.: WO2018/123769
PCT Pub. Date: Jul. 5, 2018

(65) Prior Publication Data
US 2020/0076246 A1      Mar. 5, 2020

(30) Foreign Application Priority Data

Dec. 27, 2016   (JP) ................................. 2016-253819

(51) Int. Cl.
*H02J 50/60* (2016.01)
*H02J 50/12* (2016.01)
(Continued)

(52) U.S. Cl.
CPC ............. *H02J 50/60* (2016.02); *G01V 3/101* (2013.01); *H01F 38/14* (2013.01); *H02J 50/12* (2016.02); *H02J 50/40* (2016.02)

(58) Field of Classification Search
CPC ........... H02J 50/12; H02J 50/40; H02J 50/60; G01V 3/101; H01F 38/14
(Continued)

(56) References Cited

U.S. PATENT DOCUMENTS

2013/0241302 A1    9/2013  Miyamoto et al.

FOREIGN PATENT DOCUMENTS

JP    2013-192390 A    9/2013

OTHER PUBLICATIONS

International Search Report issued in corresponding International Patent Application No. PCT/JP2017/045745, dated Feb. 6, 2018, with English Translation.

*Primary Examiner* — Hal Kaplan
(74) *Attorney, Agent, or Firm* — McDermott Will & Emery LLP

(57) ABSTRACT

A metallic foreign object detector, used in a wireless power transmission system that transmits power using an alternating magnetic field, includes antenna coils that generate a vibration signal by receiving a magnetic field or current, one or more capacitors that constitute a resonance circuit together with each of the antenna coils, and a detection part that detects a metallic foreign object by sequentially using the antenna coils. The detection part has detection modes that detect the presence/absence of the metallic foreign object based on changes in mutually different characteristics of the resonance circuit. The detection part selects one mode from the detection modes in accordance with at least one of the power feeding state of the wireless power transmission system and the position of each of the plurality of antenna (Continued)

coils and performs the detection of the metallic foreign object in the selected detection mode.

9 Claims, 9 Drawing Sheets

(51) Int. Cl.
    *H02J 50/40*     (2016.01)
    *G01V 3/10*     (2006.01)
    *H01F 38/14*     (2006.01)

(58) Field of Classification Search
    USPC .......................................................... 307/104
    See application file for complete search history.

METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

CROSS REFERENCE

This application is the U.S. National Phase under 35 US.C. § 371 of International Application No. PCT/JP2017/045745, filed on Dec. 20, 2017, which claims the benefit of Japanese Application No. 2016-253819, filed on Dec. 27, 2016, the entire contents of each are hereby incorporated by reference.

TECHNICAL FIELD

The present invention relates to a metallic foreign object detector, a wireless power transmitting device, a wireless power receiving device, and a wireless power transmission system.

BACKGROUND ART

In recent years, wireless power feeding adapted to feed power by wireless has been eagerly studied. There are various systems for realizing the wireless power feeding, and a system using a magnetic field is known as one of them. The system using a magnetic field includes an electromagnetic induction system and a magnetic field resonance system.

The electromagnetic induction system, which is already widely known, can perform power feeding with high efficiency due to a high coupling degree between a power transmitting device for feeding power and a power receiving device for receiving power, whereas power feeding cannot be achieved unless the power transmitting device and power receiving device are located close to each other. On the other hand, the magnetic field resonance system is a system that actively uses a resonance phenomenon, so that the coupling degree between the power transmitting device and the power receiving device may be low, and power feeding can be achieved even when the power transmitting device and the power receiving device are located away from each other to some extent.

The electromagnetic induction system and magnetic field resonance system both perform power feeding by using magnetism. Thus, in both the systems, the power transmitting device has a feeding coil for feeding power by using magnetism, and the power receiving device has a receiving coil for receiving power by using magnetism. The feeding coil and the receiving coil are magnetically coupled to each other, whereby power is fed from the power transmitting device to power receiving device.

When a metallic foreign object enters between the magnetically coupled feeding coil and receiving coil, an eddy current flows in the metallic foreign object by magnetic flux, resulting in heat generation in the metallic foreign object, which deteriorates power feeding efficiency. Thus, it is necessary to detect the metallic foreign object entering between the power transmitting device and the power receiving device.

As a concrete method of detecting the metallic foreign object, there is known a system that uses a plurality of antenna coils. For example, Patent Document 1 discloses a technique that refers to the Q-value of a circuit including a plurality of antenna coils and determines the presence/absence of the foreign object based on a change in the Q-value.

CITATION LIST

Patent Document

[Patent Document 1] JP 2013-192390 A

SUMMARY OF INVENTION

Technical Problem to be Solved by Invention

During power feeding, a change occurs in the characteristics of each antenna coil also due to the influence of an alternating magnetic field generated from the feeding coil. This may result in failing to accurately detect the foreign object depending on the type (Q-value, integral value, period, etc.) of a circuit characteristic to be referred to for the foreign object detection.

The present invention has been made in view of the above problem, and the object thereof is to provide a metallic foreign object detector capable of achieving high detection accuracy irrespective of the state of power feeding.

Means for Solving the Problem

A metallic foreign object detector according to the present invention is a device used in a wireless power transmission system that transmits power using an alternating magnetic field and includes a plurality of antenna coils that generate a vibration signal by receiving a magnetic field or current, one or more capacitors that constitute a resonance circuit together with each of the plurality of antenna coils, and a detection part that detects a metallic foreign object by sequentially using the plurality of antenna coils. The detection part has a plurality of detection modes that detect the presence/absence of the metallic foreign object based on changes in mutually different characteristics of the resonance circuit. The detection part selects one mode from the plurality of the detection modes in accordance with at least one of the power feeding state of the wireless power transmission system and the position of each of the plurality of antenna coils and performs the detection of the metallic foreign object in the selected detection mode.

According to the present invention, the characteristic to be referred to for the metallic foreign object detection can be changed in accordance with at least one of the power feeding state and the position of each of the plurality of antenna coils, making it possible to achieve high detection accuracy irrespective of the power feeding state.

In each of the above metallic foreign object detectors, the plurality of detection modes may include a first detection mode that detects the presence/absence of the metallic foreign object based on a change in the integral value of a waveform of a signal corresponding to the vibration signal output from the resonance circuit and a second detection mode that detects the presence/absence of the metallic foreign object based on a change in the vibration time length indicating the length of time required for vibration of a predetermined wavenumber larger than 1 of a signal corresponding to the vibration signal output from the resonance circuit. With this configuration, it is possible to detect the metallic foreign object while switching between a detection mode (first detection mode in which the integral value is referred to) capable of detecting the metallic foreign object with high accuracy in the absence of the magnetic field and a detection mode (second detection mode in which the vibration time length is referred to) in which the detection accuracy is not reduced much even in the presence of the influence of the alternating magnetic field.

Each of the above metallic foreign object detectors may further include a voltage detection part that detects voltage generated in each of the plurality of antenna coils, and the detection part may select the first detection mode for the antenna coil when the voltage detected by the voltage detection part is below a reference voltage value set in advance. With this configuration, it is possible to use a detection mode capable of achieving high accuracy in the absence of the magnetic field for the antenna coil less affected by the magnetic field depending on the position thereof, making it possible to achieve higher detection accuracy.

In each of the above metallic foreign object detectors, in the first detection mode, the detection part detects a change in the integral value by comparing the integral value of the waveform of a signal corresponding to the vibration signal output from the resonance circuit and a criterion integral value which is the integral value in the absence of the metallic foreign object, and the integral value and the criterion integral value may be obtained by integrating waveforms having the same wavenumber. This can reduce the possibility of erroneous detection in the first detection mode.

In each of the above metallic foreign object detectors, in the second detection mode, the detection part detects a change in the vibration time length by comparing the vibration time length indicating the length of time required for vibration of a predetermined wavenumber larger than 1 of a signal corresponding to the vibration signal output from the resonance circuit and a criterion time length which is the vibration time length in the absence of the metallic foreign object, and the vibration time length and the criterion time length may be obtained from waveforms having the same wavenumber. This can reduce the possibility of erroneous detection in the second detection mode.

A wireless power transmitting device according to the present invention is a device that transmits power by wireless from a feeding coil to a receiving coil and includes the feeding coil and any one of the above metallic foreign object detectors. According to the present invention, there can be provided a wireless power transmitting device having a metallic foreign object detector with improved accuracy of detection of the metallic foreign object during power feeding.

A wireless power receiving device according to the present invention is a device that transmits power by wireless from a feeding coil to a receiving coil and includes the receiving coil and any one of the above metallic foreign object detectors. According to the present invention, there can be provided a wireless power receiving device having a metallic foreign object detector with improved accuracy of detection of the metallic foreign object during power feeding.

A wireless power transmission system according to the present invention is a system that transmits power by wireless from a feeding coil to a receiving coil and includes a wireless power transmitting device having the feeding coil and a wireless power receiving device having the receiving coil. At least one of the wireless power transmitting device and the wireless power receiving device has any one of the above metallic foreign object detectors. According to the present invention, there can be provided a wireless power transmission system having a metallic foreign object detector with improved accuracy of detection of the metallic foreign object in at least one of the wireless power transmitting device and the wireless power receiving device during power feeding.

Advantageous Effects of the Invention

According to the present invention, there can be provided a metallic foreign object detector capable of achieving high detection accuracy irrespective of power feeding state.

MODE FOR CARRYING OUT THE INVENTION

Figure 1:
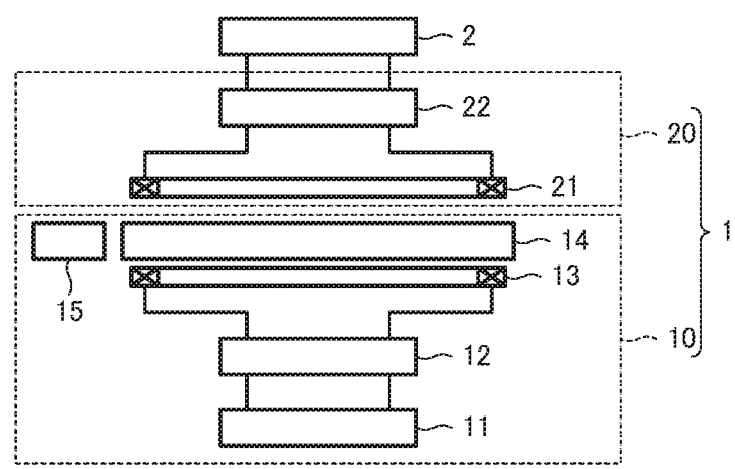
FIG. 1 is a view illustrating the schematic configuration of a wireless power transmission system 1 according to a first embodiment of the present invention and a load 2 connected to the wireless power transmission system 1.

Hereinafter, embodiments of the present invention will be described in detail with reference to the accompanying drawings. The present invention is not limited by the content described below. Further, constituent elements of the following embodiments include those easily occur to those skilled in the art, and include those substantially identical or equivalent in the scope thereof. Furthermore, in the following description, the same reference numerals are given to the same elements or elements having the same function, and repeated description will be omitted.

First Embodiment

FIG. 1 is a view illustrating the schematic configuration of a wireless power transmission system 1 according to the first embodiment of the present invention and a load 2 connected to the wireless power transmission system 1. As illustrated, the wireless power transmission system 1 includes a wireless power transmitting device 10 and a wireless power receiving device 20. The load 2 is connected to the wireless power receiving device 20.

The wireless power transmission system 1 is a system used for power feeding to a moving body such as an electric vehicle (EV) or a hybrid vehicle (HV) that utilizes power from a secondary battery. In this case, the wireless power transmitting device 10 is mounted in power feeding facility installed on the ground, and the wireless power receiving device 20 is mounted on the vehicle. The following description will be given assuming that the wireless power transmission system 1 is a system for power feeding to the electric vehicle.

Figure 2:
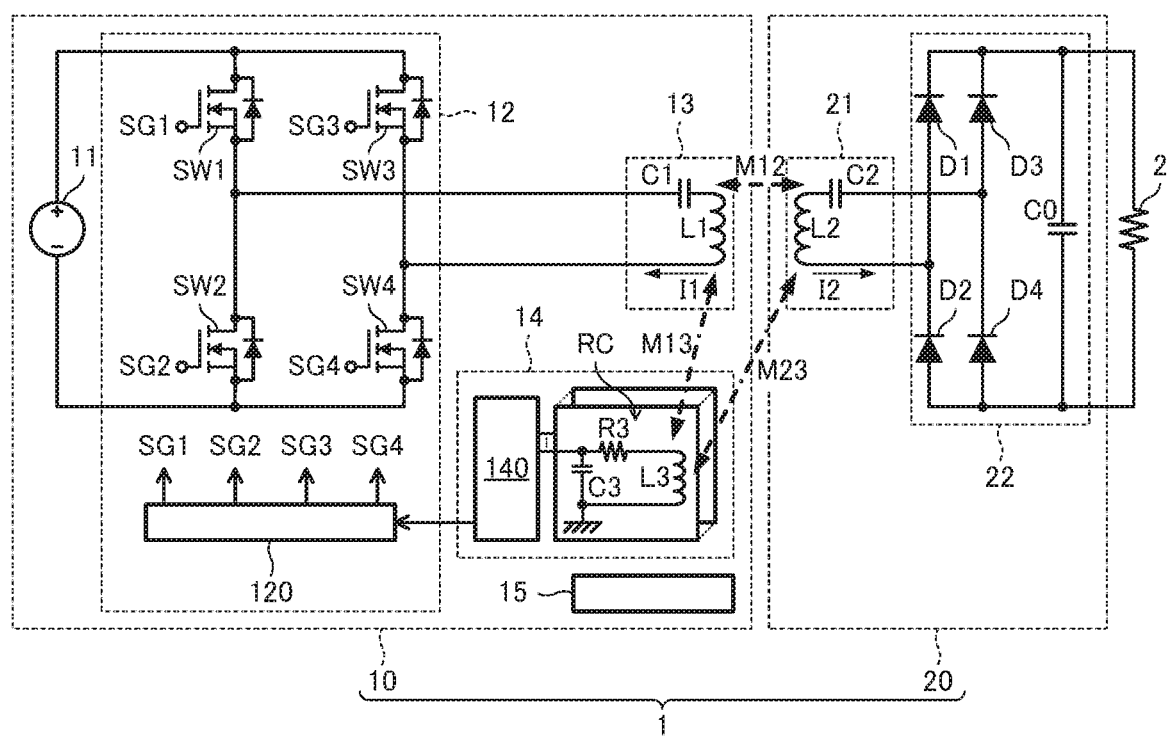
FIG. 2 is a view illustrating the internal circuit configurations of the wireless power transmitting device 10 and wireless power receiving device 20 illustrated in FIG. 1, respectively.

FIG. 2 is a view illustrating the internal circuit configurations of the wireless power transmitting device 10 and wireless power receiving device 20, respectively. Hereinafter, with reference to FIGS. 1 and 2, the outline of the configuration of the wireless power transmission system 1 will be described first, followed by detailed description of the characteristic configuration of the present invention.

As illustrated in FIGS. 1 and 2, the wireless power transmitting device 10 includes a DC power supply 11, a power converter 12, a feeding coil part 13, a metallic foreign object detector 14, and a noise detection part 15. Although the metallic foreign object detector 14 is provided in the wireless power transmitting device 10 in the present embodiment, it may be provided in the wireless power receiving device 20.

The DC power supply 11 supplies DC power to the power converter 12. The DC power supply 11 is not particularly limited in type as long as it can supply DC power. For example, a DC power supply obtained by rectifying/smoothing a commercial AC power supply, a secondary battery, a DC power supply generated by solar power, and a switching power supply such as a switching converter can be suitably used as the DC power supply 11.

The power converter 12 is an inverter that converts the DC power supplied from the DC power supply 11 into AC power to thereby supply AC current I1 illustrated in FIG. 2 to the feeding coil part 13. Specifically, as illustrated in FIG. 2, the power converter 12 includes a switching circuit (full-bridge circuit) including a plurality of bridge-connected switching elements SW1 to SW4 and a switch drive part 120. Although the switching circuit in the power converter 12 is constituted by the full-bridge circuit in this example, other type of switching circuit may be used.

The switching elements SW1 to SW4 are configured to perform ON/OFF operation independently of each other by control signals SG1 to SG4 supplied from the switch drive part 120 to the gates thereof, respectively. A MOSFET (Metal Oxide Semiconductor Field Effect Transistor) and an IGBT (Insulated Gate Bipolar Transistor) can be suitably used as the switching elements SW1 to SW4.

The switch drive part 120 is a signal generation part that generates the control signals SG1 to SG4 so that the output voltage of the switching circuit including the switching elements SW1 to SW4 becomes AC voltage of a predetermined frequency. Accordingly, the AC voltage of a predetermined frequency is supplied to a feeding coil L1 to be described later. Hereinafter, the predetermined frequency is referred to as "power transmission frequency fp". The value of the power transmission frequency fp is set to, e.g., 20 [kHz] to 200 [kHz].

As illustrated in FIG. 2, the feeding coil part 13 is a resonance circuit (feeding side resonance circuit) including a feeding side capacitor C1 and a feeding coil L1 which are connected in series and generates an alternating magnetic field based on the AC voltage supplied from the power converter 12. The resonance frequency of the feeding side resonance circuit constituting the feeding coil part 13 is set to a frequency equal or close to the above-mentioned power transmission frequency fp. The feeding side capacitor C1 may be connected parallel to the feeding coil L1.

The feeding coil L1 is a spiral structure coil formed by planarly winding, by about several turns to about several tens of turns, a litz wire obtained by twisting about two thousand insulated copper wires each having a diameter of ϕ0.1 (mm) and is disposed, e.g., in or near the ground. When AC voltage is supplied from the power converter 12 to the feeding coil L1, the AC current I1 illustrated in FIG. 2 flows in the feeding coil L1, whereby the alternating magnetic field is generated. The alternating magnetic field causes electromotive force to be generated in a receiving coil L2 to be described later by a mutual inductance M12 between the feeding coil L1 and the receiving coil L2, whereby power transmission is achieved.

The metallic foreign object detector 14 is a device having a function of detecting the presence/absence of a metallic foreign object approaching the feeding coil L1 and includes, as illustrated in FIG. 2, a plurality of resonance circuits RC each including an antenna coil L3 and a capacitor C3 for metallic foreign object detector and a detection part 140 connected to the resonance circuits RC. A resistor R3 illustrated in FIG. 2 is a series resistor of the antenna coil L3.

The metallic foreign object detector 14 is provided for the purpose of detecting a metallic foreign object existing between the feeding coil L1 and the receiving coil L2. Thus, as illustrated in FIG. 1, at least apart (specifically, antenna coils L3) of the metallic foreign object detector 14 is disposed on the surface of the feeding coil L1 opposed to the receiving coil L2, i.e., between the feeding coil L1 and the receiving coil L2. The metallic foreign object detector 14 and feeding coil L1 may be formed as an integrated unit or as separate units. Details of the metallic foreign object detector 14 will be described later.

The noise detection part 15 is configured to detect noise having a frequency higher than the power transmission frequency fp. The specific configuration of the noise detection part 15 is not particularly limited and, for example, the noise detection part 15 preferably includes a current detection circuit that detects a current waveform flowing in the feeding coil L1, a high-pass filter that extracts only a high-frequency component from an output signal from the current detection circuit, and a synchronization signal generation part that issues a synchronization signal when the amplitude of the output signal of the high-pass filter exceeds a predetermined value, i.e., during the generation period of the high-frequency component. In place of the current detection circuit, a voltage detection circuit such as a resistance-voltage dividing circuit may be used. The cut-off frequency of the high-pass filter is preferably set to a frequency higher than the power transmission frequency fp. Besides, the noise detection part 15 may be configured by disposing a magnetic sensor such as a hall element or a magnetoresistance effect element between the feeding coil L1 and the receiving coil L2.

The wireless power receiving device 20 includes a receiving coil part 21 and a rectifier 22, as illustrated in FIGS. 1 and 2.

As illustrated in FIG. 2, the receiving coil part 21 includes a resonance circuit (receiving side resonance circuit) including a receiving side capacitor C2 and a receiving coil L2 which are connected in series and plays a role as a power receiving part that receives AC power transmitted from the feeding coil L1 by wireless. The resonance frequency of the receiving side resonance circuit constituting the receiving coil part 21 is also set to a frequency equal or close to the above-mentioned power transmission frequency fp. The receiving side capacitor C2 may be connected parallel to the receiving coil L2.

Like the feeding coil L1, the receiving coil L2 is a spiral structure coil formed by planarly winding, by about several turns to about several tens of turns, a litz wire obtained by twisting about two thousand insulated copper wires each having a diameter of ϕ0.1 (mm). On the other hand, the mounting position of the receiving coil L2 differs from that of the feeding coil L1 and, for example, the receiving coil L2 is mounted to the lower portion of the body of an electric vehicle. When magnetic flux generate by the feeding coil L1 interlinks the receiving coil L2, electromotive force by electromagnetic induction is generated in the receiving coil L2, whereby AC current I2 illustrated in FIG. 2 flows in the receiving coil L2. The AC current I2 is converted into DC current by the rectifier 22 and is then supplied to the load 2. Thus, the DC power can be supplied to the load 2.

The rectifier 22 is a circuit that rectifies the AC current output from the receiving coil part 21 into DC current to supply DC power to the load 2. Specifically, as illustrated in FIG. 2, the rectifier 22 includes a bridge circuit including four bridge-connected diodes D1 to D4 and a smoothing capacitor C0 connected parallel to the bridge circuit.

The load 2 includes a charger and a battery which are not illustrated. The charger is a circuit that charges the battery based on the DC power output from the rectifier 22. The charging is executed by, e.g., constant-voltage/constant-current charging (CVCC charging). The battery is not particularly limited in type as long as it can store power. For example, a secondary battery (lithium-ion battery, a lithium-polymer battery, a nickel battery, etc.) and a capacitive element (electric double-layer capacitor, etc.) can be suitably used as the battery constituting the load 2.

Figure 3:
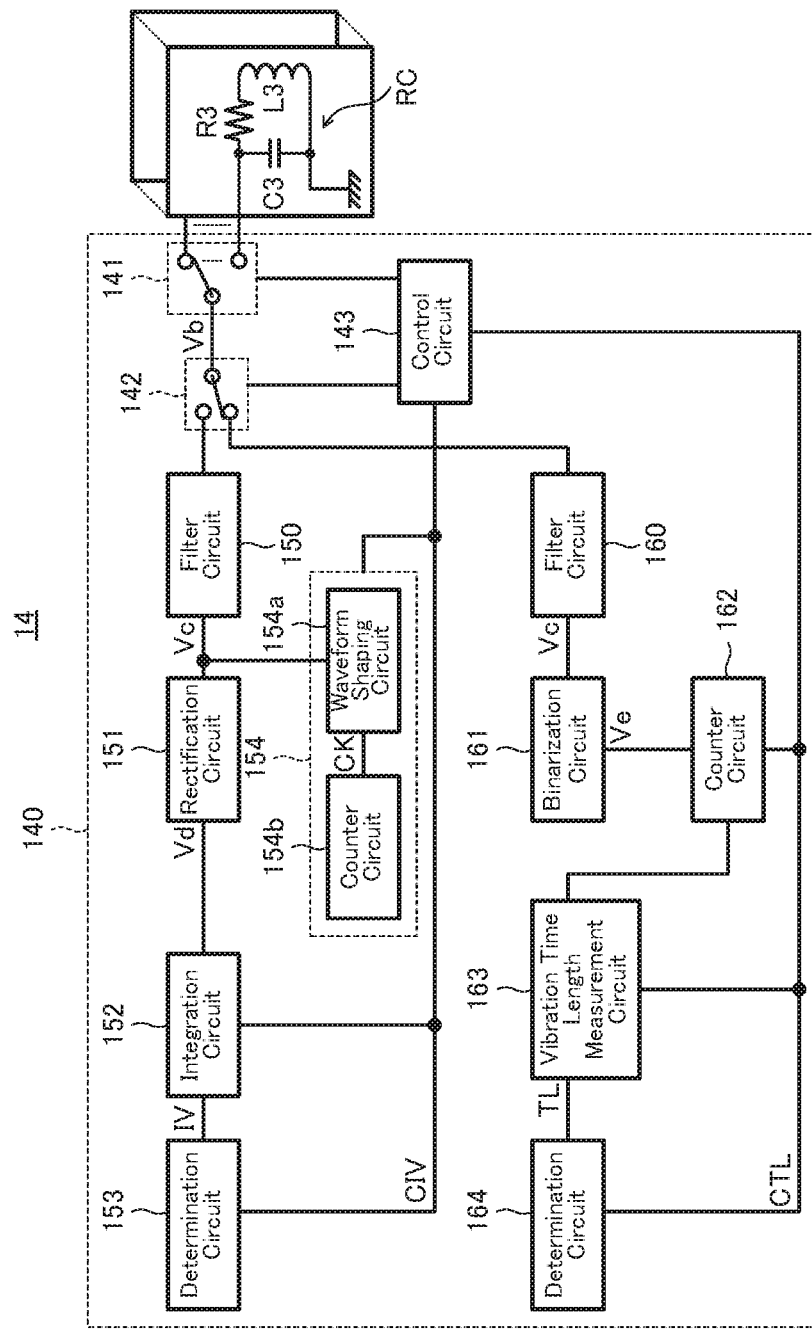
FIG. 3 is a schematic block diagram illustrating the functional block of the metallic foreign object detector 14 illustrated in FIG. 2.
Figure 4A:
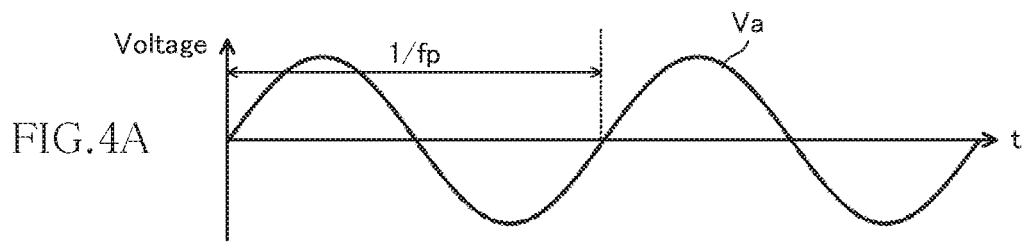
FIGS. 4A to 4F are views illustrating the waveforms of various signals concerning the metallic foreign object detector 14 illustrated in FIG. 2.
Figure 4B:
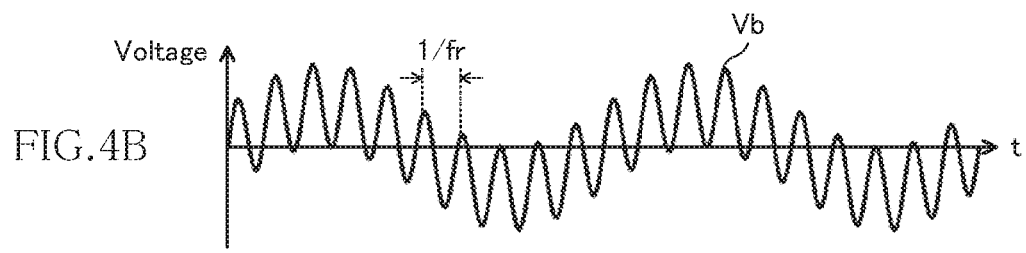
Figure 4C:
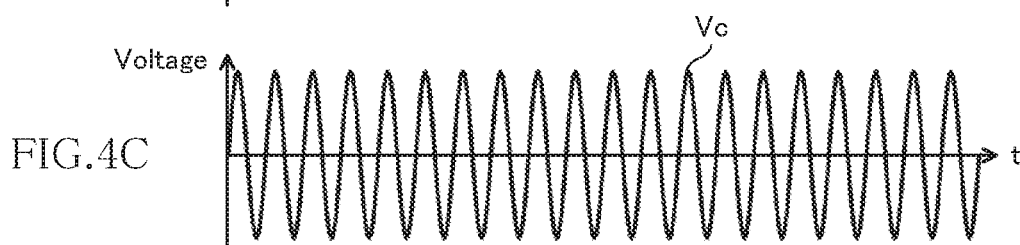
Figure 4D:
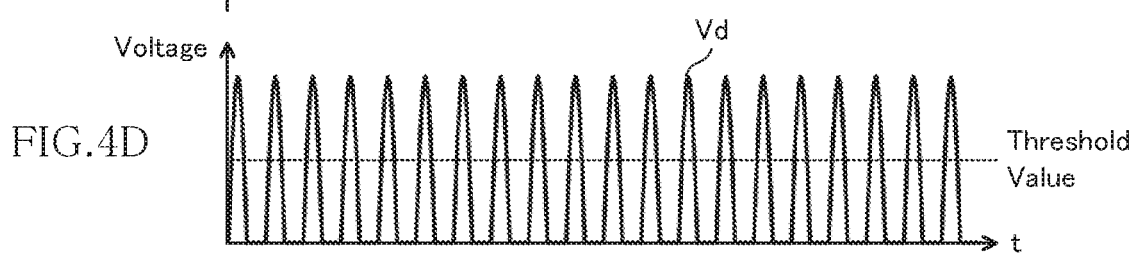
Figure 4E:
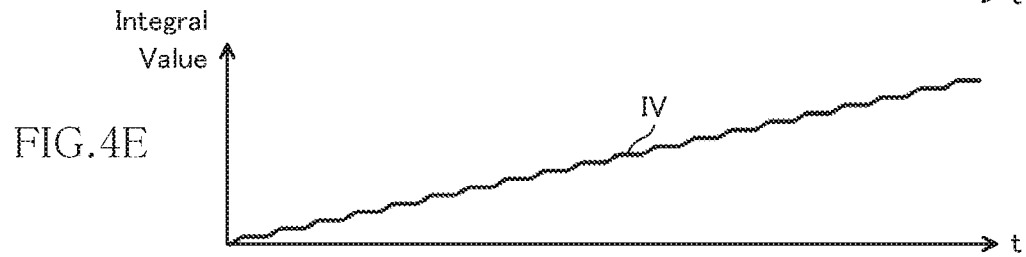
Figure 4F:
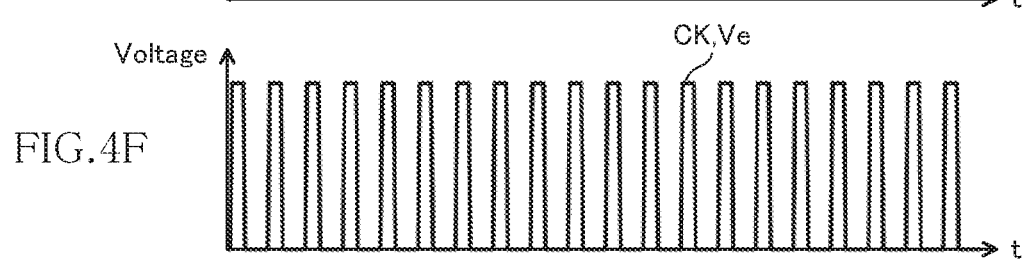
Figure 5A:
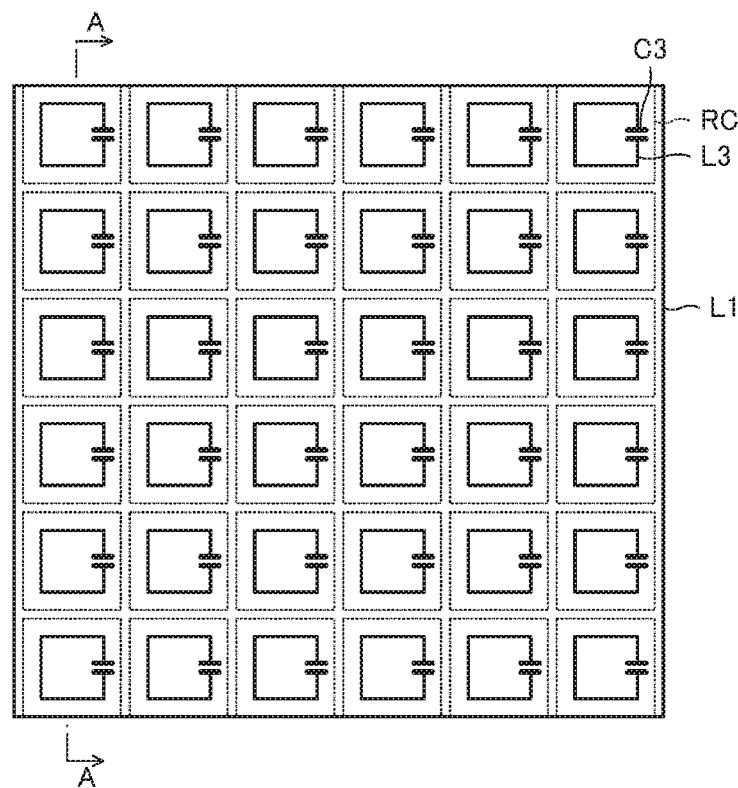
FIG. 5A is a plan view illustrating the positional relationship between the feeding coil L1 and the antenna coils L3 illustrated in FIG. 2.
Figure 5B:
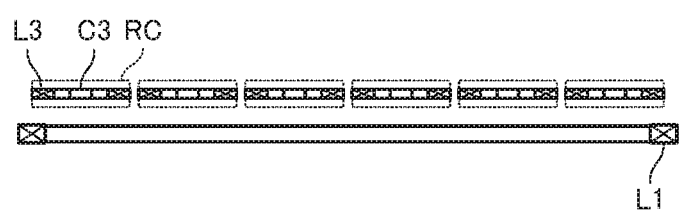
FIG. 5B is a cross-sectional view of the feeding coil L1 and the antenna coils L3 taken along line A-A of FIG. 5A.

The following describes details of the metallic foreign object detector 14 with reference to FIG. 3, FIGS. 4A to 4F, and FIGS. 5A and 5B. FIG. 3 is a schematic block diagram illustrating the functional block of the metallic foreign object detector 14. FIGS. 4A to 4F are views illustrating the waveforms of various signals concerning the metallic foreign object detector 14. FIG. 5A is a plan view illustrating the positional relationship between the feeding coil L1 and the antenna coils L3, and FIG. 5B is a cross-sectional view of the feeding coil L1 and the antenna coils L3 taken along line A-A of FIG. 5A.

Referring first to FIGS. 5A and 5B, the plurality of resonance circuits RC are arranged in a matrix within an area corresponding to the inside of the feeding coil L1, as viewed from above. Such an arrangement of the resonance circuits RC can be realized by placing, on the feeding coil L1, a printed board (not illustrated) on the surface of which a conductive coil pattern is formed.

With the above arrangement, when the above-mentioned alternating magnetic field (magnetic field vibrating at the power transmission frequency fp) occurs in the feeding coil L1, electromotive force is induced in the antenna coils L3 by a mutual inductance M13 between the feeding coil L1 and the antenna coils L3 illustrated in FIG. 2 and a mutual inductance M23 between the receiving coil L2 and the antenna coils L3 illustrated in FIG. 2. The electromotive force generates a vibration signal Vb in the antenna coils L3. That is, the antenna coils L3 according to the present embodiment are configured to generate a vibration signal by receiving a magnetic field.

The vibration signal generated in each antenna coil L3 contains, in addition to the component of the power transmission frequency fp which is the frequency of the alternating magnetic field, the component of the resonance frequency fr of each resonance circuit RC. The value of the resonance frequency fr is set to a single value extremely higher than the power transmission frequency fp by adjusting the inductance of the antenna coil L3 and the capacitance of the capacitor C3. Specifically, the value of the resonance frequency fr is preferably set to 3000 [kHz]. The capacitance of the capacitor C3 is preferably set to a value of about several hundreds [pF] to several thousands [pF].

FIG. 4A illustrates a signal Va vibrating at the power transmission frequency fp, and FIG. 4B illustrates a vibration signal Vb generated in each resonance circuit RC. FIGS. 4A and 4B reveal that the vibration signal Vb is a signal obtained by superimposing the component of the resonance frequency fr on the signal Va vibrating at the power transmission frequency fp. Although details will be described later, the detection part 140 of the metallic foreign object detector 14 extracts only the component of the resonance frequency fr from the vibration signal Vb and detects the metallic foreign object existing between the feeding coil L1 and the receiving coil L2 by utilizing a change in the component of the resonance frequency fr.

In the present embodiment, the resonance circuit RC is constituted by installing the capacitor C3 in series or parallel with each antenna coil L3. Alternatively, however, a configuration in which the capacitor C3 is not provided may be adopted. That is, the resonance circuit RC may not necessarily be formed. In this case, not the vibration signal Vb illustrated in FIG. 4B, but the signal Va illustrated in FIG. 4A is input to the detection part 140, so that the detection part 140 cannot utilize a change in the component of the resonance frequency fr for the metallic foreign object detection. Thus, in this case, the detection part 140 detects the metallic foreign object existing between the feeding coil L1 and the receiving coil L2 by utilizing a change in the component of the power transmission frequency fp.

Next, referring to FIG. 3, the detection part 140 functionally includes a detection changeover switch 141, a mode changeover switch 142, a control circuit 143, a filter circuit 150, a rectification circuit 151, an integration circuit 152, a determination circuit 153, a wavenumber detection circuit 154, a filter circuit 160, a binarization circuit 161, a counter circuit 162, a vibration time length measurement circuit 163, and a determination circuit 164. The wavenumber detection circuit 154 includes a waveform shaping circuit 154a and a counter circuit 154b.

The detection part 140 has a plurality of detection modes for detecting the presence/absence of the metallic foreign object based on changes in the different characteristics of the resonance circuit RC. In the present embodiment, as the plurality of detection modes, a first detection mode that detects the presence/absence of the metallic foreign object based on a change in the integral value of a waveform of a signal Vd corresponding to the vibration signal Vb output from the resonance circuit RC and a second detection mode that detects the presence/absence of the metallic foreign object based on a change in the vibration time length of a vibration signal Vc corresponding to the vibration signal Vb output from the resonance circuit RC are exemplified. The vibration time length is the length of time required for vibration of the vibration signal Vb corresponding to a predetermined wavenumber larger than 1. The first detection mode can detect the metallic foreign object with higher accuracy than the second detection mode in the absence of the alternating magnetic field, whereas the detection accuracy therein is easily reduced by the influence of the alternating magnetic field. On the other hand, the second detection mode detects the metallic foreign object with lower accuracy than the first detection mode in the absence of the alternating magnetic field, whereas the detection accuracy therein is not reduced much even by receiving the influence of the alternating magnetic field.

The control circuit 143 according to the present embodiment is configured to select one mode from the plurality of detection modes in accordance with the power feeding state of the wireless power transmission system 1. The detection part 140 detects the metallic foreign object according to the thus selected detection mode. Hereinafter, the functional parts provided in the detection part 140 will be described in detail.

The detection changeover switch 141 is a one-circuit multicontact type switch having a common terminal connected to the mode changeover switch 142 and a plurality of selection terminals connected to each resonance circuit RC and is configured to connect one of the selection terminals to the common terminal according to the control of the control circuit 143. As the detection changeover switch 141, a semiconductor switch or a multiplexer is preferably used.

The control circuit 143 performs switching control for the detection changeover switch 141 to sequentially connect the antenna coils L3 one by one to the mode changeover switch 142 at an equal time interval. After connecting the last antenna coil L3 to the mode changeover switch 142, the control circuit 143 repeats the connection operation from the first antenna coil L3.

The control circuit 143 may be configured to exclude some of the plurality of antenna coils L3 from the connection target coils according to the user's setting or the like. This allows an area to be subjected to the metallic foreign object detection to be narrowed to increase detection time of the metallic foreign object by one antenna coil L3 as compared to a case where all the antenna coils L3 are used.

While the capacitor C3 is provided for each antenna coil L3 in the present embodiment, the total number of the capacitors C3 may be only one. In this case, only the antenna coil L3 that is connected to the mode changeover switch 142 by switching of the detection changeover switch 141 constitutes the resonance circuit RC together with the one capacitor C3. This configuration can reduce the number of the capacitors C3, which in turn can reduce the number of components constituting the metallic foreign object detector 14. When the capacitor C3 is provided for each antenna coil L3, a switch for switching the connection between the antenna coil L3 and the capacitor C3 may be provided for each of the resonance circuits RC and configured so as to disconnect, at the time of the metallic foreign object detection, the capacitor C3 from each of the antenna coils L3 other than the one that is connected to the mode changeover switch 142 by switching of the detection changeover switch 141. This suppresses magnetic coupling between the antenna coil L3 connected to the mode changeover switch 142 by switching of the detection changeover switch 141 and other antenna coils L3 during the metallic foreign object detection, making it possible to further improve the accuracy of detection of the metallic foreign object.

The mode changeover switch 142 is a one-circuit two-contact type switch having a common terminal connected to the detection changeover switch 141 and two selection terminals connected respectively to the filter circuits 150 and 160 and is configured to connect one of the selection terminals to the common terminal according to the control of the control circuit 143. A semiconductor switch or a multiplexer is preferably used also as the mode changeover switch 142.

The control circuit 143 selects one mode from the plurality of detection modes in accordance with the power feeding state of the wireless power transmission system 1 and performs switching control for the mode changeover switch 142 based on the selection result to thereby switch the detection mode of the detection part 140 for detecting the presence/absence of the metallic foreign object. Specifically, the control circuit 143 connects the detection changeover switch 141 and the filter circuit 150 to bring the detection part 140 into the first detection mode and connects the detection changeover switch 141 and the filter circuit 160 to bring the detection part 140 into the second detection mode.

The power feeding state of the wireless power transmission system 1 includes "during power feeding" and "during interruption of power feeding" in the present embodiment. The control circuit 143 refers to, e.g., AC current I1 illustrated in FIG. 2 to determine that the wireless power transmission system 1 is "during power feeding" or "during interruption of power feeding". When determining that the wireless power transmission system 1 is "during interruption of power feeding", the control circuit 143 connects the detection changeover switch 141 and the filter circuit 150 to bring the detection part 140 into the first detection mode. As described above, the first detection mode can detect the metallic foreign object with higher accuracy than the second detection mode in the absence of the alternating magnetic field, so that it is possible to detect the metallic foreign object with high accuracy during interruption of power feeding under such control by the control circuit 143. On the other hand, when determining that the wireless power transmission system 1 is "during power feeding", the control circuit 143 connects the detection changeover switch 141 and filter circuit 160 to bring the detection part 140 into the second detection mode. As described above, in the second detection mode, the detection accuracy is not reduced much even by receiving the influence of the alternating magnetic field, so that it is possible to detect the metallic foreign object with comparatively high accuracy even during power feeding is under such control of the control circuit 143.

Hereinafter, the configuration and operation of the detection part 140 in the first and second detection modes will be described.

The first mode is realized by the filter circuit 150, rectification circuit 151, integration circuit 152, determination circuit 153, and wavenumber detection circuit 154.

The filter circuit 150 is a circuit that generates a vibration signal Vc illustrated in FIG. 4C by removing the component of the power transmission frequency fp from the vibration signal Vb generated in the antenna coil L3 connected thereto through the detection changeover switch 141. Specifically, the filter circuit 150 may be constituted by a band-pass filter that extracts a frequency of the same band as the resonance frequency fr. On the other hand, when the capacitor C3 is not provided, that is, when the resonance circuit RC is not constituted, it is preferable to constitute the filter circuit 150 by a band-pass filter that extracts a frequency of the same band as the power transmission frequency fp.

The rectification circuit 151 is a circuit that rectifies the vibration signal Vc output from the filter circuit 150 to generate the pulse-like signal Vd illustrated in FIG. 4D. As the rectification circuit 151, a switching element such as a diode, a diode bridge circuit, or a semiconductor switch is preferably used. The signal Vd illustrated in FIG. 4D is an example of a signal obtained when the rectification circuit 151 is constituted by a half-wave rectification circuit; however, the rectification circuit 151 may be constituted by a full-wave rectification circuit, or other rectification circuit.

The integration circuit 152 is a circuit that obtains an integral value IV of the waveform of the signal Vd generated by the rectification circuit 151. Since the signal Vd is a pulse-like signal as described above, the integral value IV of the integration circuit 152 increases stepwise while the signal Vd is generated, as illustrated in FIG. 4E. The start and end of the integration by the integration circuit 152 are controlled by the control circuit 143.

The wavenumber detection circuit 154 is a circuit that detects the wavenumber of the vibration signal Vc. Specifically, the waveform shaping circuit 154a generates a binary signal CK illustrated in FIG. 4F from the vibration signal Vc, and the counter circuit 154b counts the wavenumber of the binary signal CK to thereby detect the wavenumber of the vibration signal Vc. Hereinafter, the operation of the above circuits will be described in detail.

The waveform shaping circuit 154a performs threshold determination on the vibration signal Vc output from the filter circuit 150 to generate the binary signal CK. As a threshold value used in the threshold determination, a reference voltage value set in advance is preferably used. The concrete value of the reference voltage value is set to, e.g., the amplitude center voltage (e.g., 0 V) of the vibration signal Vc when the metallic foreign object is absent. The binary signal CK is a signal that becomes high when the result of the threshold determination is equal to or larger than the threshold and becomes low when the result of the threshold determination is less than the threshold. Accordingly, the period of the binary signal CK coincides with the inverse of the resonance frequency fr of the resonance circuit RC. In the present embodiment, the binary signal CK is generated by the threshold determination on the vibration signal Vc; however, the waveform shaping circuit 154a may generate the binary signal by performing threshold determination on the signal Vd generated by the rectification circuit 151.

The counter circuit 154b is a circuit that performs counting using the binary signal CK generated by the waveform shaping circuit 154a as a clock and generates a digital value (count value) indicating the result of the counting. The start time and end time of the counting by the counter circuit 154b are controlled by the control circuit 143. The count value generated by the counter circuit 154b coincides with the wavenumber of the vibration signal Vc, so that the wavenumber detection circuit 154 outputs the count value as the detection result of the wavenumber of the vibration signal Vc.

The control circuit 143 controls the integration circuit 152 and the counter circuit 154b. Specifically, provided that the detection part 140 is operating in the first detection mode, every time the control circuit 143 switches the selection among the antenna coils L3, it supplies a predetermined wavenumber detection start signal to make the wavenumber detection circuit 154 start the wavenumber detection (specifically, make the counter circuit 154b start counting) and supplies a predetermined integration start signal to make the integration circuit 152 start the integration. Thereafter, the control circuit 143 monitors the result (specifically, the count value output from the counter circuit 154b) of the wavenumber detection made by the wavenumber detection circuit 154. When the detection result reaches a predetermined value (hereinafter, referred to as "integration target wavenumber"), the control circuit 143 supplies a predetermined integration end signal to make the integration circuit 152 end the integration and supplies a predetermined wavenumber detection end signal to make the wavenumber detection circuit 154 end the wavenumber detection (specifically, make the counter circuit 154b end the counting). The integration circuit 152 supplies the integral value IV at the time point when the integration has thus been ended to the determination circuit 153.

The timing at which the control circuit 143 makes the wavenumber detection circuit 154 start the wavenumber detection and the timing at which the control circuit 143 makes the integration circuit 152 start the integration may be the same or different. As an example of the latter case, a configuration may be exemplified, in which first the wavenumber detection circuit 154 starts the wavenumber detection, and then the integration circuit 152 starts the integration when the detected wavenumber reaches a predetermined value. This method is suitable considering that the integral value IV and a criterion integral value CIV to be described later are obtained by integrating waveforms having the same wavenumber.

The control circuit 143 also performs operation for acquiring a criterion integral value CIV serving as a criterion for the integral value IV. The criterion integral value CIV is an integral value IV when the metallic foreign object is absent between the feeding coil L1 and the receiving coil L2. The control circuit 143 executes the above control in a state where the absence of the metallic foreign object between the feeding coil L1 and the receiving coil L2 is guaranteed to acquire the criterion integral value CIV. At this time, the control circuit 143 uses the same value of the above-mentioned integration target wavenumber as used when the integral value IV is acquired in normal operation. Accordingly, the integral value IV and the criterion integral value CIV are obtained by integrating waveforms having the same wavenumber. The control circuit 143 outputs the acquired criterion integral value CIV to the determination circuit 153 and stores the value CIV therein.

The determination circuit 153 is a circuit that detects the presence/absence of the metallic foreign object between the feeding coil L1 and the receiving coil L2 based on the integral value IV supplied from the integration circuit 152 and the criterion integral value CIV supplied in advance from the control circuit 143. Specifically, when the absolute value of the difference between the integral value IV and the criterion integral value CIV falls within a predetermined value, the determination circuit 153 determines the absence of the metallic foreign object, and otherwise, it determines the presence thereof.

The determination result output from the determination circuit 153 is supplied to the control circuit 143. When the determination result indicates the presence of the metallic foreign object, the control circuit 147A instructs the switch drive part 120 illustrated in FIG. 2 to stop electric power conversion performed in the power converter 12. Upon receiving the instruction, the switch drive part 120 adjusts the control signals SG1 to SG4 illustrated in FIG. 2 so as not to allow AC power to be output from the power converter 12. As a result, the power feeding operation by the wireless power transmitting device 10 is stopped, making it possible to prevent an eddy current from occurring in the metallic foreign object due to an alternating magnetic field generated between the feeding coil L1 and the receiving coil L2, which in turn prevents the metallic foreign object from generating heat.

The second mode is realized by the filter circuit 160, binarization circuit 161, counter circuit 162, vibration time length measurement circuit 163, and determination circuit 164.

The filter circuit 160 is a circuit having the same configuration as that of the filter circuit 150 and generates the vibration signal Vc illustrated in FIG. 4C by removing the component of the power transmission frequency fp from the vibration signal Vb generated in the antenna coil L3 connected thereto through the detection changeover switch 141. The filter circuits 150 and 160 may be realized by a single common filter circuit.

The binarization circuit 161 compares the voltage value of the vibration signal Vc output from the filter circuit 160 and a reference voltage value (e.g., 0 V) set in advance to generate a binary signal Ve illustrated in FIG. 4F. The binary signal Ve assumes a high level when the voltage value of the vibration signal Vc is equal to or larger than the reference voltage value and assumes a low level when the voltage value of the vibration signal Vc is smaller than the reference voltage value. As can be seen from FIG. 4F, the binary signal Ve has substantially the same waveform as the binary signal CK.

The counter circuit 162 counts the wavenumber of the binary signal Ve output from the binarization circuit 161 to thereby count the wavenumber of the vibration signal Vc. The timing at which the counter circuit 162 starts counting is designated by the control circuit 143.

The vibration time length measurement circuit 163 is a circuit that measures a vibration time length TL indicating the length of time required for the vibration of the vibration signal Vc corresponding to a predetermined wavenumber larger than 1. The wavenumber mentioned here is equivalent to a period of the vibration signal Vc. The start point of the measurement of the vibration time length TL by the vibration time length measurement circuit 162 and the wavenumber of the vibration signal Vc to be referred to for measurement of the vibration time length TL can be freely adjusted by the control circuit 143. The measurement of the vibration time length by the vibration time length measurement circuit 163 is achieved by measuring time required for the increment of the count value of the counter circuit 162 after when the start of the measurement is instructed by the control circuit 143 to reach the wavenumber designated by the control circuit 143.

The control circuit 143 controls the counter circuit 162 and the vibration time length measurement circuit 163. Specifically, provided that the detection part 140 is operating in the second detection mode, every time the control circuit 143 switches the selection among the antenna coils L3, it supplies a predetermined wavenumber detection start signal to make the counter circuit 162 start the counting and supplies a predetermined measurement start signal to make the vibration time length measurement circuit 163 start the measurement of the vibration time length. Thereafter, the control circuit 143 monitors the count value output from the counter circuit 162. When the detection result reaches a predetermined value (hereinafter, referred to as "vibration time length measurement target wavenumber"), the control circuit 143 supplies a predetermined measurement end signal to make the vibration time length measurement circuit 163 end the measurement and supplies a predetermined wavenumber detection end signal to make the counter circuit 162 end the counting. The vibration time length measurement circuit 163 supplies the thus measured vibration time length TL to the determination circuit 164.

The timing at which the control circuit 143 makes the counter circuit 162 start the wavenumber detection and the timing at which the control circuit 143 makes the vibration time length measurement circuit 163 start the measurement may be the same or different. As an example of the latter case, a configuration may be exemplified, in which first the counter circuit 162 starts the counting, and then the vibration time length measurement circuit 163 starts the measurement when the count value reaches a predetermined value. This method is suitable considering that the vibration time length TL and a criterion time length CTL to be described later are obtained from waveforms having the same wavenumber.

The control circuit 143 also performs operation for acquiring a criterion time length CTL serving as a criterion for the vibration time length TL. The criterion time length CTL is a value of the vibration time length TL when the metallic foreign object is absent between the feeding coil L1 and the receiving coil L2. The control circuit 143 executes the above control in a state where the absence of the metallic foreign object between the feeding coil L1 and the receiving coil L2 is guaranteed to acquire the criterion time length CTL. At this time, the control circuit 143 uses the same value of the above-mentioned vibration time length measurement target wavenumber as used when the vibration time length TL is acquired in normal operation. Accordingly, the vibration time length TL and the criterion time length CTL are obtained by measuring waveforms having the same wavenumber. The control circuit 143 outputs the acquired criterion time length CTL to the determination circuit 164 and stores the value CTL therein.

The determination circuit 164 is a circuit that detects the presence/absence of the metallic foreign object between the feeding coil L1 and the receiving coil L2 based on the vibration time length TL supplied from the vibration time length measurement circuit 163 and the criterion time length CTL supplied in advance from the control circuit 143 and stored therein. Specifically, when the absolute value of the difference between the vibration time length TL and the criterion time length CTL falls within a predetermined value, the determination circuit 164 determines the absence of the metallic foreign object, and otherwise, it determines the presence thereof.

The determination result of the determination circuit 164 is supplied to the control circuit 143. The operation of the control circuit 143 after receiving the determination result is the same as in the first detection mode. That is, when the determination result indicating the presence of the metallic foreign object is supplied, the control circuit 143 instructs the switch drive part 120 illustrated in FIG. 2 to stop electric power conversion performed in the power converter 12. Upon receiving the instruction, the switch drive part 120 adjusts the control signals SG1 to SG4 illustrated in FIG. 2 so as not to allow AC power to be output from the power converter 12. As a result, the power feeding operation by the wireless power transmitting device 10 is stopped, making it possible to prevent an eddy current from occurring in the metallic foreign object due to the alternating magnetic field generated between the feeding coil L1 and the receiving coil L2, which in turn prevents the metallic foreign object from generating heat.

As described above, according to the metallic foreign object detector 14 of the present embodiment, the characteristic to be referred to for the metallic foreign object detection can be changed in accordance with the power feeding state of the wireless power transmission system 1. Specifically, during interruption of power feeding, the metallic foreign object detection (first detection mode) can be performed by referring to the integral value, while during power feeding, the metallic foreign object detection (second detection mode) can be performed by referring to the period. Thus, it is possible to achieve high detection accuracy irrespective of the power feeding state.

Second Embodiment

The following describes the wireless power transmission system 1 according to a second embodiment of the present invention. The wireless power transmission system 1 according to the present embodiment differs from the wireless power transmission system 1 according to the first embodiment only in the operation of the control circuit 143 illustrated in FIG. 3. Other configurations are the same as those of the wireless power transmission system 1 according to the first embodiment, so the same reference numerals are given to the same components as in the first embodiment, and description will be made focusing only on the difference from the first embodiment.

Referring to FIG. 3 again, the control circuit 143 according to the present embodiment stores, in advance, therein, information indicating the positions of the respective antenna coils L3 in the matrix-like arrangement illustrated in FIG. 5A. Based on the information, i.e., in accordance also with the position of the antenna coil L3, the control circuit 143 selects one mode from the plurality of detection modes for each of the plurality of antenna coils L3.

Further, in the present embodiment, the power feeding state of the wireless power transmission system 1 includes "during interruption of power feeding", "during power feeding (low power)" and "during power feeding (high power)". The control circuit 143 performs threshold determination on, e.g., the AC current I1 illustrated in FIG. 2 to determine the present power feeding state. That is, when the AC current I1 is equal to or smaller than a predetermined first threshold value (e.g., 0 A), the control circuit 143 determines the present power feeding state to be "during interruption of power feeding", when the AC current I1 is larger than the first threshold value and equal to or smaller than a predetermined second threshold value larger than the first threshold value, the control circuit 143 determines the present power feeding state to be "during power feeding (low power)", and when the AC current I1 is larger than the second threshold value, the control circuit 143 determines the present power feeding state to be "during power feeding (high power)".

Figure 6:
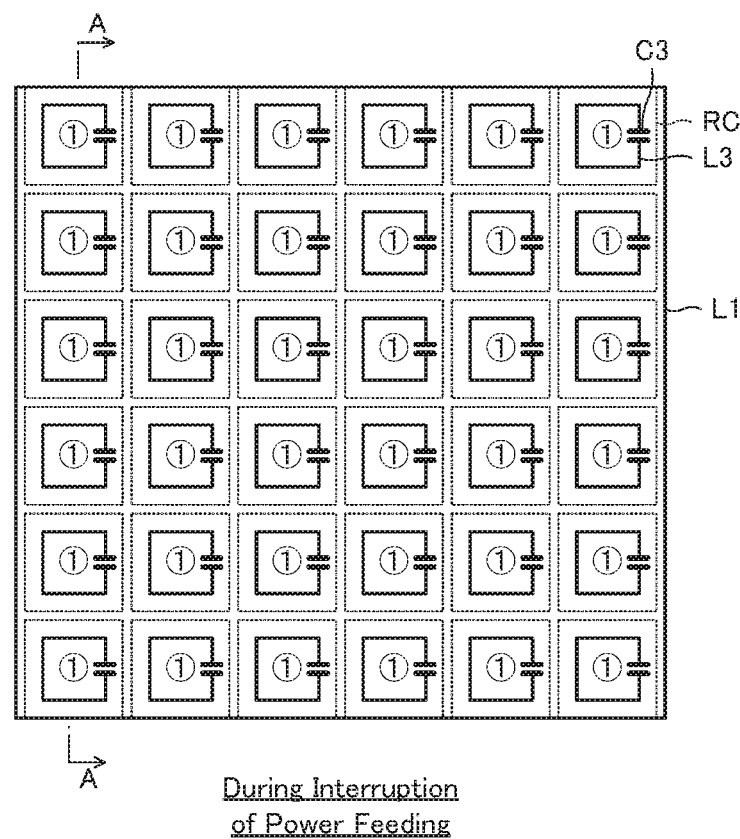
FIG. 6 is a view illustrating a detection mode allocation state to the antenna coils L3 during interruption of power feeding in a second embodiment of the present invention.
Figure 7:
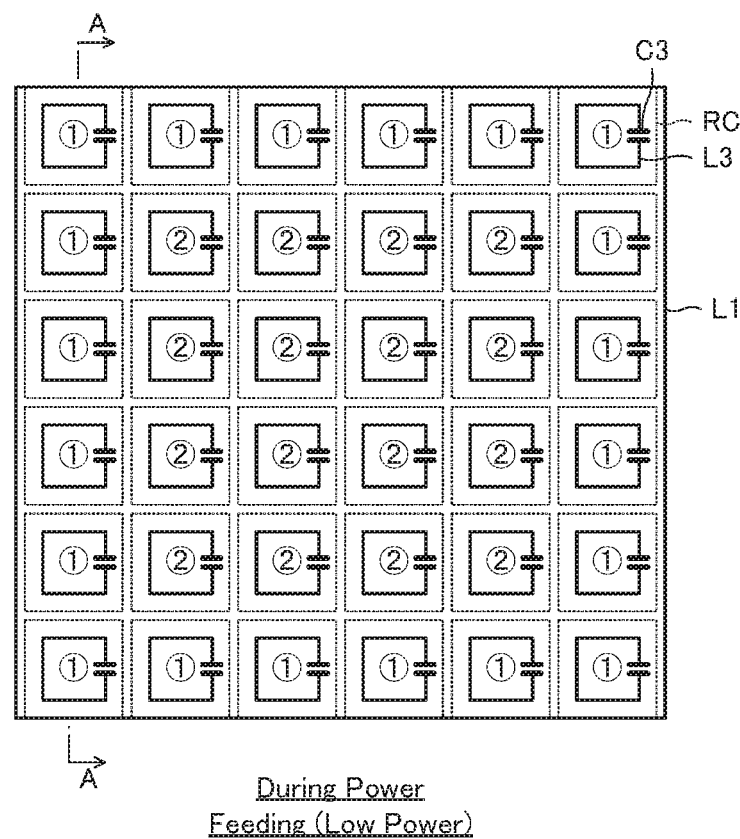
FIG. 7 is a view illustrating a detection mode allocation state to the antenna coils L3 during power feeding (low power) in the second embodiment of the present invention.
Figure 8:
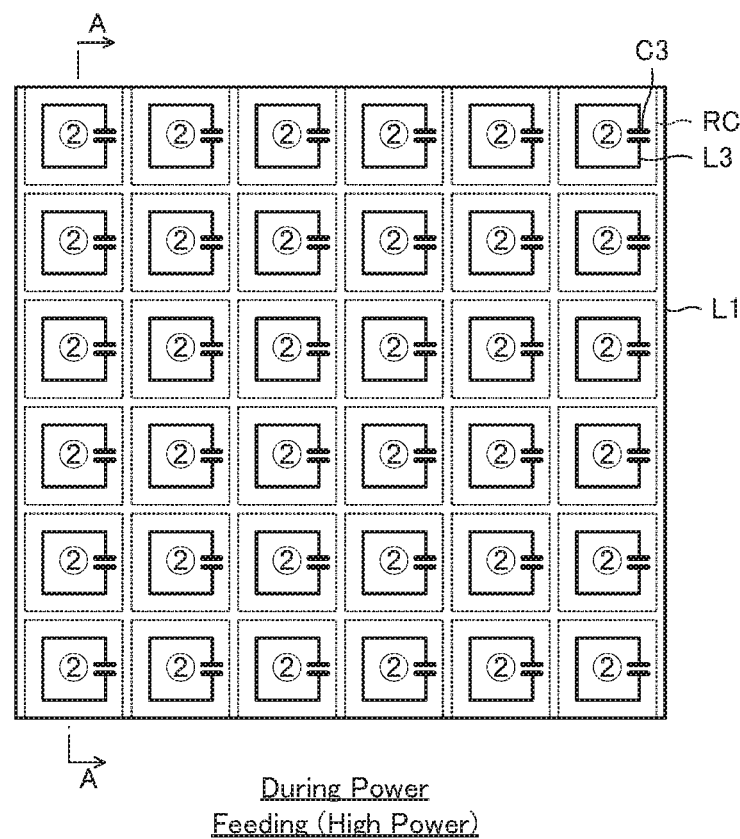
FIG. 8 is a view illustrating a detection mode allocation state to the antenna coils L3 during power feeding (high power) in the second embodiment of the present invention.

FIGS. 6 to 8 are views respectively illustrating a detection mode allocation state to the antenna coils L3 during interruption of power feeding, that during power feeding (low power) and that during power feeding (high power). In each of FIGS. 6 to 8, the circled number given for each antenna coil L3 represents the detection mode that the control circuit 143 selects for the antenna coil L3.

As illustrated in FIG. 6, when the control circuit 143 determines the present power feeding state to be "during interruption of power feeding", it selects the first detection mode for all the antenna coils L3. As a result, it is possible to detect the metallic foreign object with high accuracy during interruption of power feeding.

As illustrated in FIG. 8, when the control circuit 143 determines the present power feeding state to be "during power feeding (high power)", it selects the second detection mode for all the antenna coils L3. As a result, it is possible to detect the metallic foreign object with comparatively high accuracy even during power feeding.

As illustrated in FIG. 7, when the control circuit 143 determines the present power feeding state to be "during power feeding (low power)", it selects the first detection mode for the antenna coils L3 positioned at the outermost periphery and selects the second detection mode for the remaining antenna coils L3. When feeding power is low, the amount of magnetic flux interlinking the antenna coils L3 positioned at the outermost periphery is not so large even during power feeding, so that the antenna coils L3 at the outermost periphery exhibit higher detection accuracy in the first detection mode than in the second detection mode. On the other hand, a large amount of magnetic flux interlinks the antenna coils L3 positioned inside even when feeding power is low, so that the antenna coils L3 positioned inside exhibit higher detection accuracy in the second detection mode than in the first detection mode. Thus, by selecting one mode from the plurality of different detection modes in accordance with the position of the antenna coil, it is possible to detect the metallic foreign object with higher accuracy.

As described above, according to the metallic foreign object detector 14 of the present embodiment, the characteristic to be referred to for the metallic foreign object detection can be changed not only in accordance with the power feeding state, but also in accordance with the position of each antenna coil L3. Specifically, the metallic foreign object detection can be achieved such that: during interruption of power feeding, the integral value is referred to for all the antenna coils L3 (first detection mode); during power feeding (low power), the integral value is referred to for the antenna coils L3 positioned at the outermost periphery (first detection mode) while the period is referred to for the remaining antenna coils L3 (second detection mode); and during power feeding (high power), the period is referred to for all the antenna coils L3 (second detection mode). Thus, it is possible to achieve higher detection accuracy than in the first embodiment.

In the present embodiment, the first detection mode is selected for the antenna coils L3 positioned at the outermost periphery during power feeding (low power); however, it is preferable to appropriately determine for which antenna coils L3 the first detection is actually selected based on experiments or simulations. Further, four or more states may be used as the power feeding state. That is, in this case, the detection mode used for each of the antenna coils L3 may be determined for each of the four or more states.

Further in the present embodiment, the characteristic to be referred to for the metallic foreign object detection is changed in accordance with both the power feeding state and the position of each antenna coil L3; however, the control circuit 143 may change the characteristic to be referred to for the metallic foreign object detection in accordance with only the position of each antenna coil L3 (i.e., irrespective of the power feeding state). For example, the detection modes to be used for the antenna coils L3 may be fixed as illustrated in FIG. 7, irrespective of the power feeding state.

Third Embodiment

The following describes the wireless power transmission system 1 according to a third embodiment of the present invention. The wireless power transmission system 1 according to the present embodiment differs from the wireless power transmission system 1 according to the first embodiment only in that the control circuit 143 illustrated in FIG. 3 selects the detection mode based on the both-end voltage of each antenna coil L3. Other configurations are the same as those of the wireless power transmission system 1 according to the first embodiment, so the same reference numerals are given to the same components as in the first embodiment, and description will be made focusing only on the difference from the first embodiment.

Figure 9:
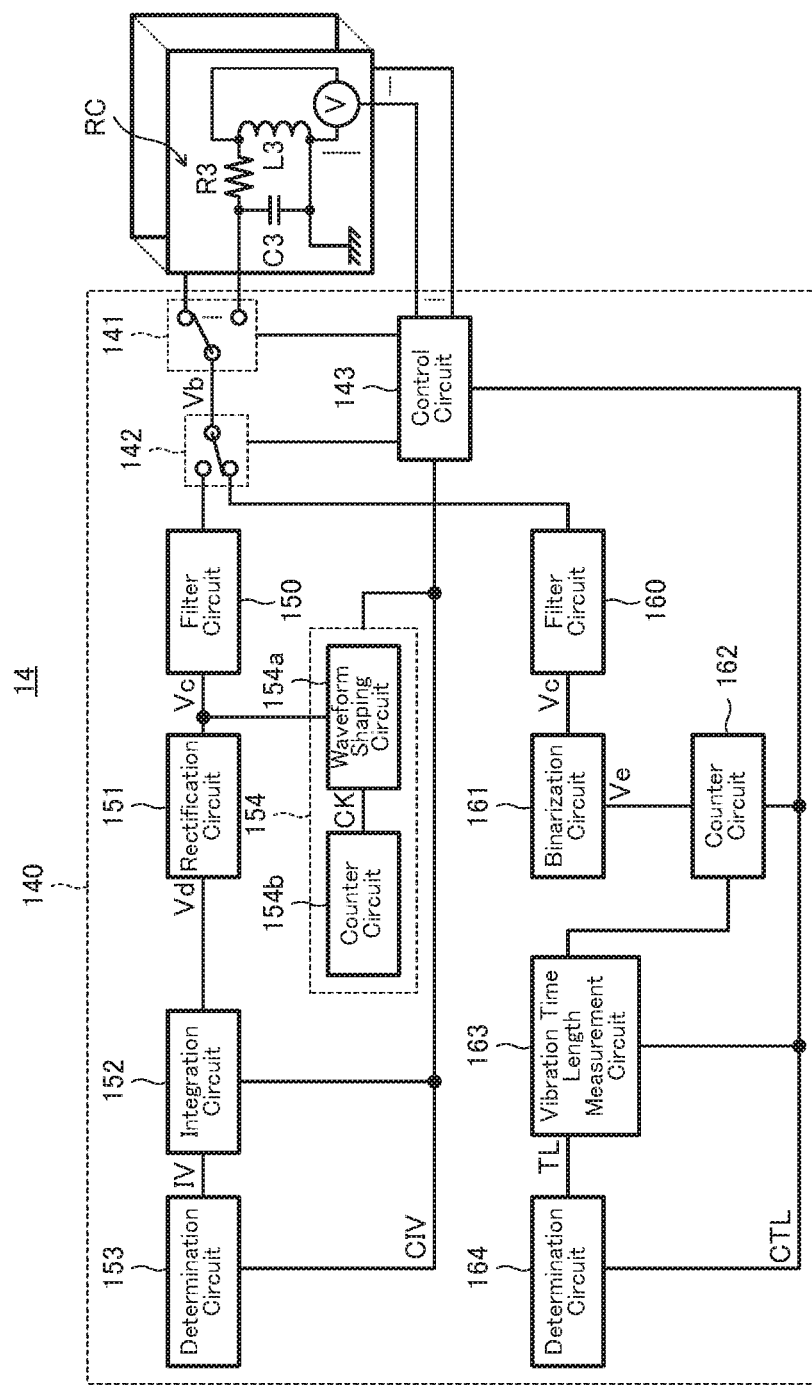
FIG. 9 is a schematic block diagram illustrating the functional block of the metallic foreign object detector 14 according to a third embodiment of the present invention.

FIG. 9 is a schematic block diagram illustrating the function block of the metallic foreign object detector 14 according to the present embodiment. As illustrated, the control circuit 143 according to the present embodiment functions as a voltage detection part that detects voltage generated in each of the plurality of antenna coils L3. The control circuit 143 selects the first detection mode for the antenna coil L3 whose voltage is below a reference voltage value set in advance even when the second detection mode should be selected according to the control described in the first embodiment (i.e., even during power feeding). With this configuration, it is possible to use the first detection mode capable of achieving high accuracy in the absence of the magnetic field even during power feeding for the antenna coil L3 less affected by the magnetic field depending on the position thereof even during power feeding.

As described above, according to the metallic foreign object detector 14 of the present embodiment, it is possible to use the first detection mode capable of achieving high accuracy in the absence of the magnetic field even during power feeding for the antenna coil L3 less affected by the magnetic field depending on the position thereof, making it possible to achieve higher detection accuracy than in the first embodiment.

While the preferred embodiment of the present invention has been described, the present invention is not limited to the above embodiment and may be practiced in various forms without departing from the spirit and scope of the present invention.

For example, although each antenna coil L3 is configured to generate the vibration signal by receiving the magnetic field in the above embodiments, it may be configured to generate the vibration signal by receiving current. Specifically, the following configuration may be adopted: current is applied momentarily to the antenna coil L3 every time the detection of the metallic foreign object is performed, and the metallic foreign object is detected based on an attenuation vibration signal generated by the current. Also in this configuration, it is possible to achieve high detection accuracy by controlling the detection mode in the manner as described in the above embodiments.

Further, in the above embodiments, the first detection mode in which the integral value is referred to and the second detection mode in which the period is referred to are exemplified; however, in addition to or in place of one or both of the above detection modes, a detection mode that detects the metallic foreign object by referring to other circuit characteristics such as a Q-value may be used. Also in this case, the detection mode preferably includes a detection mode capable of achieving high detection accuracy in the absence of the alternating magnetic field and a detection mode in which the detection accuracy is not reduced much even in the presence of the influence of the alternating magnetic field.

REFERENCE SIGNS LIST 1 wireless power transmission system
2 load
10 wireless power transmitting device
11 DC power supply
12 power converter
13 feeding coil part
14 metallic foreign object detector
15 noise detection part
20 wireless power receiving device
21 receiving coil part
22 rectifier
120 switch drive part
140 detection part
141 detection changeover switch
142 mode changeover switch
143 control circuit
150, 160 filter circuit
151 rectification circuit
152 integration circuit
153, 163 determination circuit
154, 164 wavenumber detection circuit
154a, 164a waveform shaping circuit
154b, 164b counter circuit
161 binarization circuit
162 vibration time length measurement circuit
C period
C0 smoothing capacitor
C1 feeding side capacitor
C2 receiving side capacitor
C3 capacitor for metallic foreign object detector
CC reference period
CIV criterion integral value
D1-D4 diode
IV integral value
L1 feeding coil
L2 receiving coil
L3 antenna coil
R3 series resistor of the antenna coil L3
RC resonance circuit
SG1-SG4 control signal
SW1-SW4 switching element

What is claimed is:

1. A metallic foreign object detector used in a wireless power transmission system that transmits power using an alternating magnetic field, the metallic foreign object detector comprising:
   a plurality of antenna coils that generate a vibration signal by receiving a magnetic field or current;
   one or more capacitors that constitute a resonance circuit together with each of the plurality of antenna coils; and
   a detection part at detects a metallic foreign object by sequentially using the plurality of antenna coils,
   wherein the detection part has a plurality of detection modes that detect a presence/absence of the metallic foreign object based on changes in mutually different characteristics of the resonance circuit, and
   wherein the detection part selects one mode from the plurality of the detection modes in accordance with at least one of a power feeding state of the wireless power transmission system and a position of each of the plurality of antenna coils and performs a detection of the metallic foreign object in a selected detection mode.

2. The metallic foreign object detector as claimed in claim 1, wherein the plurality of detection modes include a first detection mode that detects the presence/absence of the metallic foreign object based on a change in an integral value of a waveform of a signal corresponding to the vibration signal output from the resonance circuit and a second detection mode that detects the presence/absence of the metallic foreign object based on a change in a vibration time length indicating the length of time required for vibration of a predetermined wavenumber larger than 1 of a signal corresponding to the vibration signal output from the resonance circuit.

3. The metallic foreign object detector as claimed in claim 2, further comprising a voltage detection part that detects voltage generated in each of the plurality of antenna coils,
wherein the detection part selects the first detection mode for the antenna coil when the voltage detected by the voltage detection part is below a reference voltage value set in advance.

4. The metallic foreign object detector as claimed in claim 2,
wherein, in the first detection mode, the detection part detects a change in the integral value by comparing the integral value of the waveform of the signal corresponding to the vibration signal output from the resonance circuit and a criterion integral value which is an integral value in an absence of the metallic foreign object, and
wherein the integral value and the criterion integral value are obtained by integrating waveforms having the same wavenumber.

5. The metallic foreign object detector as claimed in claim 2,
wherein, in the second detection mode, the detection part detects a change in the vibration time length by comparing the vibration time length indicating the length of time required for vibration of a predetermined wavenumber larger than 1 of the signal corresponding to the vibration signal output from the resonance circuit and a criterion time length which is the vibration time length in an absence of the metallic foreign object, and
wherein the vibration time length and the criterion time length are obtained from waveforms having the same wavenumber.

6. A wireless power transmitting device that transmits power by wireless from a feeding coil to a receiving coil, the wireless power transmitting device comprising:
the feeding coil; and
the metallic foreign object detector as claimed in claim 1.

7. A wireless power receiving device that transmits power by wireless from a feeding coil to a receiving coil, the wireless power receiving device comprising:
the receiving coil; and
the metallic foreign object detector as claimed in claim 1.

8. A wireless power transmission system that transmits power by wireless from a feeding coil to a receiving coil, the wireless power transmission system comprising:
a wireless power transmitting device having the feeding coil; and
a wireless power receiving device having the receiving coil,
wherein at least one of the wireless power transmitting device and wireless power receiving device has the metallic foreign object detector as claimed in claim 1.

9. The metallic foreign object detector as claimed in claim 3,
wherein, in the first detection mode, the detection part detects a change in the integral value by comparing the integral value of the waveform of the signal corresponding to the vibration signal output from the resonance circuit and a criterion integral value which is an integral value in an absence of the metallic foreign object, and
wherein the integral value and the criterion integral value are obtained by integrating waveforms having the same wavenumber.

* * * * *